(No Model.) 2 Sheets—Sheet 1.

C. M. GARRISON.
MEANS FOR UTILIZING THE CURRENT FORCE OF RUNNING WATER.

No. 385,261. Patented June 26, 1888.

WITNESSES: INVENTOR:
R. L. Clemmitt. Chas. M. Garrison
John E. Morris. BY Chas. B. Mann
ATTORNEY.

N. PETERS, Photo-Lithographer, Washington, D. C.

(No Model.) 2 Sheets—Sheet 2.
C. M. GARRISON.
MEANS FOR UTILIZING THE CURRENT FORCE OF RUNNING WATER.
No. 385,261. Patented June 26, 1888.
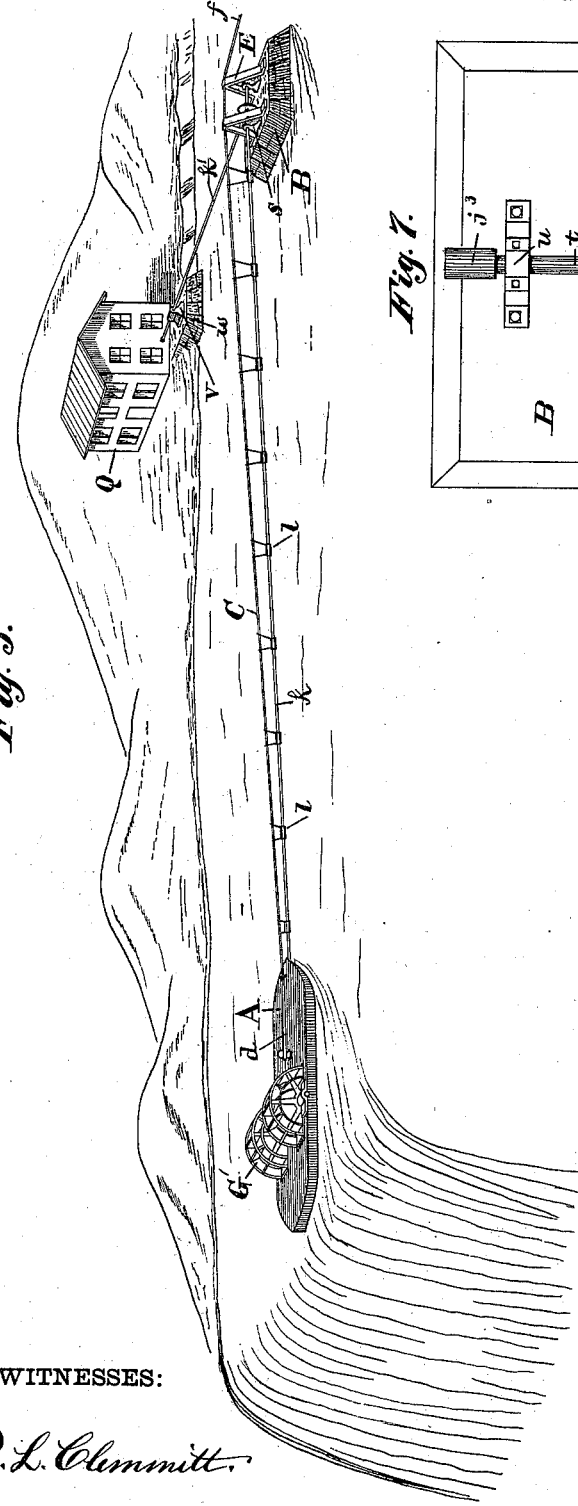
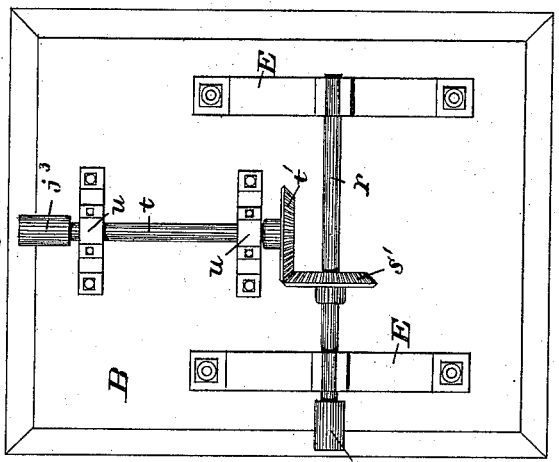
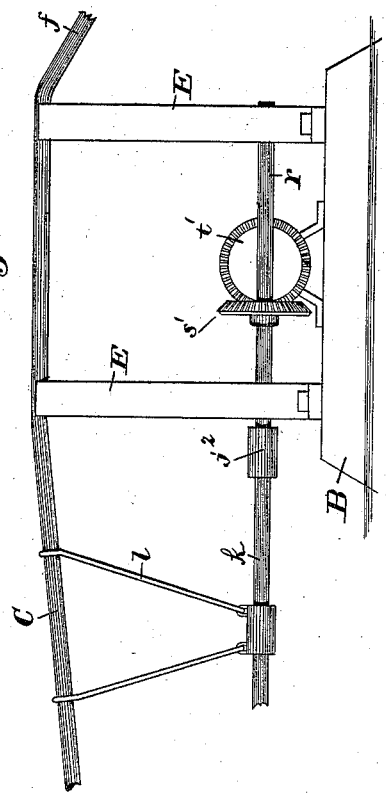
WITNESSES:
R. L. Clemmitt.
John E. Morris.
INVENTOR:
Chas. M. Garrison
BY Chas. B. Mann
ATTORNEY.
N. PETERS. Photo-Lithographer, Washington, D. C.

UNITED STATES PATENT OFFICE.

CHARLES M. GARRISON, OF WICHITA, KANSAS.

MEANS FOR UTILIZING THE CURRENT FORCE OF RUNNING WATER.

SPECIFICATION forming part of Letters Patent No. 385,261, dated June 26, 1888

Application filed May 8, 1888. Serial No. 273,202. (No model.)

*To all whom it may concern:*

Be it known that I, CHARLES M. GARRISON, a citizen of the United States, residing at Wichita, in the county of Sedgwick and State of Kansas, have invented certain new and useful Improvements in Means for Utilizing the Current Force of Running Water, of which the following is a specification.

This invention relates to means for utilizing the current force of running water for driving machinery.

The accompanying drawings illustrate the invention, in which—

Figure 1:
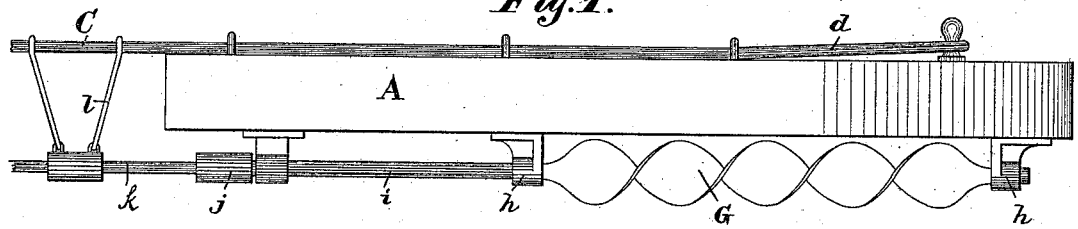
Figure 2:
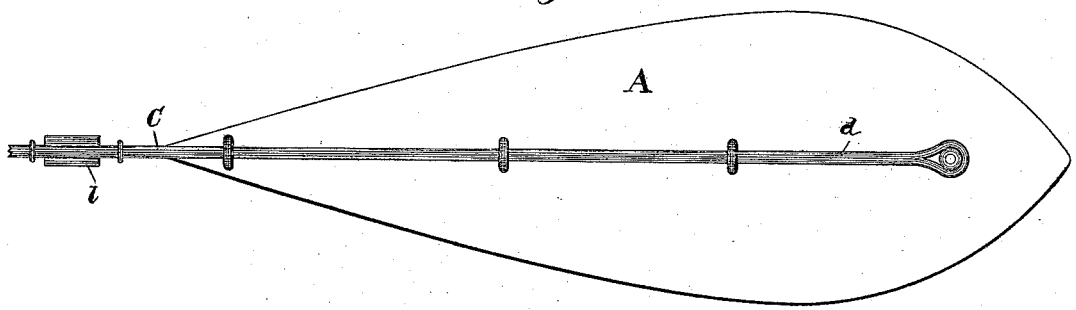
Figure 3:
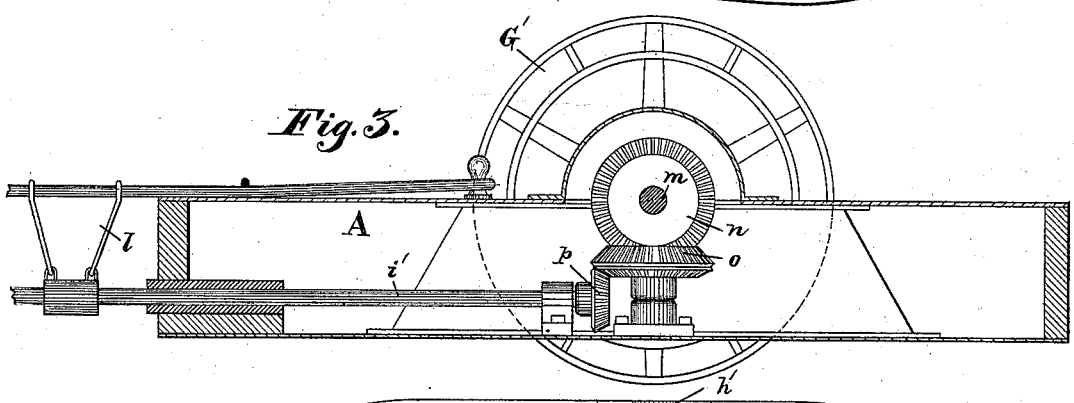
Figure 4:
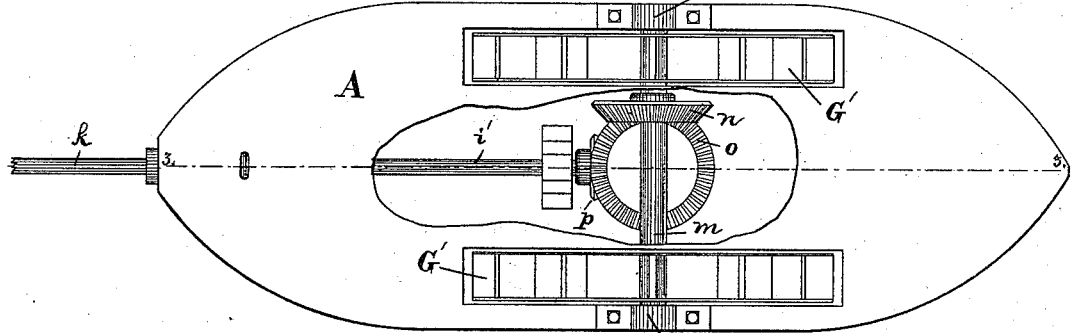

Figures 1 and 2 show side and top views, respectively, of a floating vessel provided with a power-screw. Figs. 3 and 4 show sectional and top views, respectively, of a floating vessel provided with an undershot power-wheel. Fig. 5 is a perspective view showing a running stream, water-fall, floating vessel, pier, power-house on land, and connections for the transmission of power from the floating vessel to the power-house. Fig. 6 is a side elevation of the mechanism on the pier. Fig. 7 is a plan or top view of the pier and mechanism upon it.

The floating vessel A may be constructed of any suitable size or material, and must have strength sufficient to withstand the current or the floating ice if the situation is one where the float will be exposed to ice. The float is oblong or pointed at both ends. A pier, B, of stone or iron, is built up the stream above the swift current. The float has position in the swift current downstream from the pier. A suitable wire cable, C, has one end, d, securely attached to the float A, and is supported on a horse, E, mounted on and secured to the pier, and the other end, f, of the cable extends upstream and is suitably anchored. The stability of the cable, the pier, and the anchorage is very important, as the power to be utilized and transmitted is dependent on these parts.

The float is provided with one or more power wheels or screws, which are acted on and set in motion by the current of running water.

The drawings illustrate plans both for wheels and screws, and the latter will be described first. The power-screw G (shown in Figs. 1 and 2) is mounted in bearings h, attached to the float. The shaft i of the screw projects forward on the float, and is attached by a coupling, j, to a flexible shaft, k, which extends to the pier B. The shaft is supported by hangers l, which are suspended at intervals from the wire cable C. Thus the cable not only holds the float A to its position, but supports the flexible shaft k.

The power-wheels G' (shown in Figs. 3 and 4) are mounted on a shaft, m, which is supported in bearings h'. This shaft carries a bevel-wheel, n, which gears with another wheel, o, and the latter in turn gears with a bevel-pinion, p, on the shaft i', which projects forward on the float, and, like the screw-shaft first mentioned, is attached by a coupling, j, to the flexible shaft k, which leads to the pier B. In this case, as in that of the screw first described, there is the same arrangement of cable C and hangers l.

It will be understood that either a screw or a wheel may be used to take up the power of the water-current, or both screw and wheel may be employed.

The pier B has the horse or truss E, before named, on which the cable C is supported. The construction of this horse is such that suitable gearing may be placed below the cable and on top of the pier for changing the direction of the power-transmitting flexible shaft k, in order to carry it to a power-house, Q, on the shore.

The gearing referred to may be of any suitable kind, and in the present instance comprises a shaft, r, in bearing s, a bevel-wheel, s', on the said shaft, a second shaft, t, in bearings u, and provided with a bevel-wheel, t'. The two bevel-wheels are engaged or mesh together. The flexible shaft k from the float is connected by a coupling, j², with the said first shaft, r, and a second flexible shaft, k', is connected by a coupling, j³, with the said second shaft, t, and leads from the pier B to the power-house Q. A suitable bearing, v, for this second flexible shaft is shown on a pier, w, at the shore edge.

It will be readily understood that the second flexible shaft, k', whose end enters the power-house, may be connected to any kind of machinery in the power-house.

By this construction and arrangement the float A may be moved sidewise in the stream while held securely from the pier and anchorage. The float may be placed in that position or locality where the surface current is strongest. As many floats and power-shafts may be used as desired, or as the size of the stream will permit. These devices may be used for utilizing the power of the current of Niagara river just above the falls, or any other natural falls where the float can be anchored.

Having described my invention, I claim—

As a means for utilizing the power of running water, the combination of a floating vessel, a pier and anchorage, a cable connecting the floating vessel and pier, a screw or wheel on the floating vessel which may be set in motion by the current of running water, a flexible shaft by which the movement of the screw or wheel is transmitted, and hangers suspended from the cable to support the flexible shaft.

In testimony whereof I affix my signature in the presence of two witnesses.

CHARLES M. GARRISON.

Witnesses:
C. L. ADAMS,
JNO. L. G. CARNEY.